United States Patent
Kingdon et al.

(10) Patent No.: US 6,735,222 B1
(45) Date of Patent: May 11, 2004

(54) SYSTEM AND METHOD FOR TIME SLOT OFFSET EVALUATION IN AN ASYNCHRONOUS TDMA NETWORK

(75) Inventors: Christopher H. Kingdon, Garland, TX (US); Anders T. Holmring, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/134,208

(22) Filed: Aug. 14, 1998

(51) Int. Cl.[7] .................................. H04J 3/06
(52) U.S. Cl. ........................ 370/508; 370/519
(58) Field of Search ........................ 370/324, 337, 370/347, 350, 503, 508, 519, 321, 91, 442; 455/51.1; 375/356

(56) References Cited

U.S. PATENT DOCUMENTS

| | | | | |
|---|---|---|---|---|
| 5,260,943 A | * | 11/1993 | Comroe et al. ............ 370/95.1 |
| 5,293,380 A | * | 3/1994 | Kondo ....................... 370/95.3 |
| 5,410,588 A | | 4/1995 | Ito .............................. 379/58 |
| 5,528,597 A | | 6/1996 | Gerszberg et al. ......... 370/95.3 |
| 5,654,960 A | * | 8/1997 | Kohlschmidt .............. 370/337 |
| 5,790,939 A | * | 8/1998 | Malcolm et al. ........... 455/13.2 |
| 5,872,823 A | * | 2/1999 | Sutton ........................ 375/372 |
| 6,112,100 A | * | 8/2000 | Ossoinig et al. ............ 455/502 |

OTHER PUBLICATIONS

M. Mouly, M.B. Pautet, "The GSM System for Mobile Communication"; 1992, ISBN 2–9507190–0–7, p. 201.

* cited by examiner

*Primary Examiner*—Steven H. D. Nguyen
*Assistant Examiner*—Duc Duong

(57) ABSTRACT

A system and method in a digital TDMA telecommunication system for evaluating time slot offsets of asynchronously operating transmitters. The transmitters are equipped to receive a common reference clock signal, whereupon the value of the reference clock signal is recorded at transmission of specific time slots. The transmitters then perform a modulo operation on the recorded time and reports the result to a controlling node. Results of the modulo operation may then be compared with similar results reported by other transmission sources to the controlling node to determine relative time slot offsets between the transmission sources.

17 Claims, 5 Drawing Sheets

SYSTEM AND METHOD FOR TIME SLOT OFFSET EVALUATION IN AN ASYNCHRONOUS TDMA NETWORK

BACKGROUND OF THE INVENTION

1. Technical Field of the Invention

The present invention relates to the mobile communications field and, in particular, to a method and system for determining time slot offsets in a non-synchronized Time Division Multiple Access (TDMA) network.

2. Description of Related Art

TDMA mobile communications systems can be either inter-cell synchronous or inter-cell asynchronous systems. In other words, the base stations (BSs) in an inter-cell synchronous system are accurately synchronized with one another, and the BSs in an inter-cell asynchronous system are not. More specifically, asynchronous BSs do not share a common time reference, and their transmissions, therefore, have arbitrary timing relative to each other. An example of an inter-cell synchronous system is the North American IS-95 system. Examples of inter-cell asynchronous systems include the Wideband Code Division Multiple Access (WCDMA) systems proposed in the CODIT, ETSI SMG2 Group Alpha, and ARIB technical specifications and Ericsson's GSM system protocols.

A number of disadvantages exist with inter-cell synchronous systems. One prerequisite for such systems is a high level of synchronization among the BSs with the degree of synchronization generally measured in microseconds ($\mu s$). Also, it is believed that a loss in frequency reuse efficiency is realized in an inter-cell synchronous network, at a cost of valuable bandwidth.

However, an area in which the synchronous network has shown particular advantage over non-synchronous networks is in mobile positioning applications. Synchronous networks have a distinct advantage over non-synchronous networks since, by design, the synchronous networks share a reference clock. Triangulation algorithms may then be utilized to measure delays in the time of arrival of specific time slot numbers from a particular mobile station (MS) to a base station. With, in general, measurements from a MS to three BSs, the position of an MS within a telecommunications system may be accurately determined.

When BSs are operating asynchronously, however, the task of location calculation is complicated by the fact that each BS is operating on clocks independent from one another. For example, while one BS is receiving data on Time slot Number 1 (TN1), another BS might be simultaneously receiving on TN3. To make an effective location determination, the respective delay of the MS transmission to the BS reception must be ascertained along with the relative TN offset with respect to the other BSs participating in the location calculations.

A better understanding of the problems associated with positioning in asynchronous networks may be had with reference to FIGS. 1 and 2. FIG. 1 illustrates a typical framing scheme as employed in a digital TDMA communications system. The numbering scheme depicted is specific to the European GSM system and is used only for illustrative purposes. Shown are contiguous frames, denoted F1 through F2715647, the span of which is often referred to as a hyperframe, and one single frame of the hyperframe, specifically frame 2 (F2), is shown in more detail. In GSM, the transmission of such frames occurs on carrier frequencies with an approximate bandwidth of 200 kHz separating adjacent transmissions.

As illustrated by the expanded frame F2, each single frame contains eight individual time slots numbered TN0 through TN7 therein. One time slot of a TDMA frame on one carrier is referred to as a physical channel. Therefore, a mobile station transmitting on a particular carrier will occupy a specific time slot, or physical channel, on contiguous frames thereby allowing up to eight such "simultaneous" communications on the carrier frequency depicted on the respective time slots TN0 to TN7.

Mobile stations are, in general, within reception range of a number of BSs with a traffic channel maintained between the mobile station and that BS exhibiting the best communication characteristics, i.e., signal to interference ratio. As is understood in the art, however, when RF characteristics decline below a specified level or when RF characteristics from another BS increase beyond a specific threshold relative to the current BS with which the mobile station is maintaining the traffic channel, a handover is initiated where a traffic channel is setup between the mobile station and the BS exhibiting the better communication characteristics and, concurrently, the traffic channel between the mobile station and BS previously in use is broken. However, in specific situations, i.e., MS positioning, a number of BSs may concurrently tune to the same transmitting MS in order to make time delay of arrival measurements between the MS and the BSs.

FIG. 2 illustrates a network containing three BSs 50, 60, and 70, in a telecommunications network, generally designated by the reference numeral 90, operating asynchronously and sharing a common node, or Base Station Controller (BSC) 80. Each of the BSs are transmitting data in a TDMA format consistent with the aforedescribed data frames such as shown in FIG. 1. Since the BSs are operating asynchronously, however, their frame transmission times will have no time correspondence other than that by coincidence.

For convenience of discussion, BS 50 is taken as a reference in FIG. 2 and the beginning of its current frame transmission is designated as occurring at a time of zero seconds ($t_{11}=0$). Here, the first digit of the double subscript indicates both the number of the BS, e.g., BS 50 or the first ("1") BS, while the second subscript refers to the reference base station from which corresponding times are measured, i.e., BS 50, again the first ("1") BS. As is understood in the art, the time span of a single GSM frame transmission is approximately 4.615 ms. With reference now to the frame transmission corresponding to BS 60, which as discussed is asynchronous to the other BSs and offset from the other frame transmissions such as that of BS 50, BS 60 (the second "2" BS) begins its current frame transmission, F5000, at $t_{21}=1.026$ ms, or 1.026 ms after BS 50 began transmitting its frame F3, the base reference time in this example. As discussed, BS 60 completes the transmission of frame F5000 about 4.615 ms after commencing transmission, i.e., at time $t_{21}=5.641$ ms, at which point frame F5001 commences. Likewise, BS 70 (the third "3" BS) begins transmission of its current frame F11358 at time $t_{31}=3.969$ ms after BS 50 began transmitting its frame F3 and 2.666 ms after BS 60 began transmitting its frame F5000. Completion of transmission of frame F11358 by BS 70 arrives one frame time length later, i.e., $t_{31}=8.307$ ms, as illustrated in FIG. 2.

Since the frame lengths and time slot lengths are of constant durations, a single time slot has a span of 0.577 ms. Lines 100 and 110 may then be constructed to gain further insight into the time slot offsets between particular BSs within the telecommunication network 90. Line 100, drawn from the start point of frame F5000 of BS 60 to intersect the corresponding time point within frame F3 of the reference BS 50, indicates that BS 60 began transmitting its time slot zero (TN0) within frame F5000 at a point in time where BS 50 has completed transmission of its TN0 and additionally about 78% of its TN1. Similarly, line 110, drawn from the start point of frame F11358 to intersect the corresponding time points within frame F5000 of BS 60 and frame F3 of the reference BS 50, indicates that BS 70 began transmitting its TN0 at a point in time where BS 60 is in progress of transmitting its TN4 and, where BS 50 is in progress of transmitting its TN6.

The transmission offsets of the aforedescribed network are simply the result of non-synchronous operation. The BSs are free to begin transmissions when needed and without correspondence between ongoing transmission in nearby BSs. Thus, any BS frame transmission in an asynchronous network may begin at a time corresponding to the transmission of the beginning, end, or any fraction thereof of a frame transmitted by a nearby BS. Clearly, it would be advantageous for transmitting BSs to be able to measure their frame transmissions times with reference to a common clock so that any transmission offsets therebetween could easily be determined.

It is, accordingly, a first object of the present invention to provide an improved system and method for measuring asynchronous base station time slot offsets in a mobile telecommunications network.

It is also an object of the invention that the system and method of the present invention substantially adhere to the TDMA protocols.

It is a further object of the invention to provide a time slot offset measurement system and method where a controlling node is capable of collecting time slot offset data on a number of base stations where the time slot offset data may be collected intermittently and independently from a particular reference base station with respect to any of the other base stations controlled by the controlling node.

SUMMARY OF THE INVENTION

In accordance with the present invention, a system and method are provided for measuring the time slot offsets in an asynchronous digital TDMA network of transmissions originating from different transmission sources driven by individual non-common internal clock signals. The transmission sources are equipped to receive a common reference clock signal, whereupon the transmission sources' individual non-common internal clocks are each phase locked with the common reference clock signal. A number of transmission sources are coupled to a common node by signaling channels that may occupy either a hard-wire or radio frequency (RF) link. Each individual transmission source is capable of reading the value of the reference clock signal value corresponding to a particular moment a specific time slot is transmitted. The value of the reference clock signal corresponding to a particular time slot transmission is then recorded by the transmission source. The transmission source then performs a modulo operation on the recorded time and reports the result to a controlling node. Results of the modulo operation may then be compared with similar results reported by other transmission sources to the controlling node to determine relative time slot offsets between the transmission sources. In another embodiment of the present invention, the transmission sources may forward the time as measured by the reference clock corresponding to a particular time slot transmission directly to the controlling node whereupon the controlling node performs the modulo calculations. In still another embodiment of the present invention, the transmission time is measured by a monitoring node next to the transmission source.

BRIEF DESCRIPTION OF THE DRAWINGS

A more complete understanding of the system and method of the present invention may be obtained by reference to the following Detailed Description when taken in conjunction with the accompanying drawings wherein.

DETAILED DESCRIPTION OF THE PRESENTLY PREFERRED EXEMPLARY EMBODIMENTS

Although the preferred embodiments of the present invention may be embodied in many different forms, the invention should not be construed as limited to the embodiments set forth herein; rather, these embodiments are provided so that this disclosure will be through and complete, and will fully convey the scope of the invention to those skilled in the art.

Figure 1:
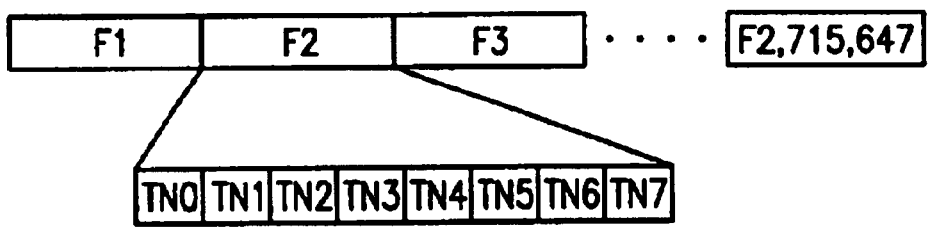
FIG. 1 illustrates conventional TDMA framing and time slot schemes such as employed by telecommunication systems particularly suited for application of the present invention.
Figure 2:
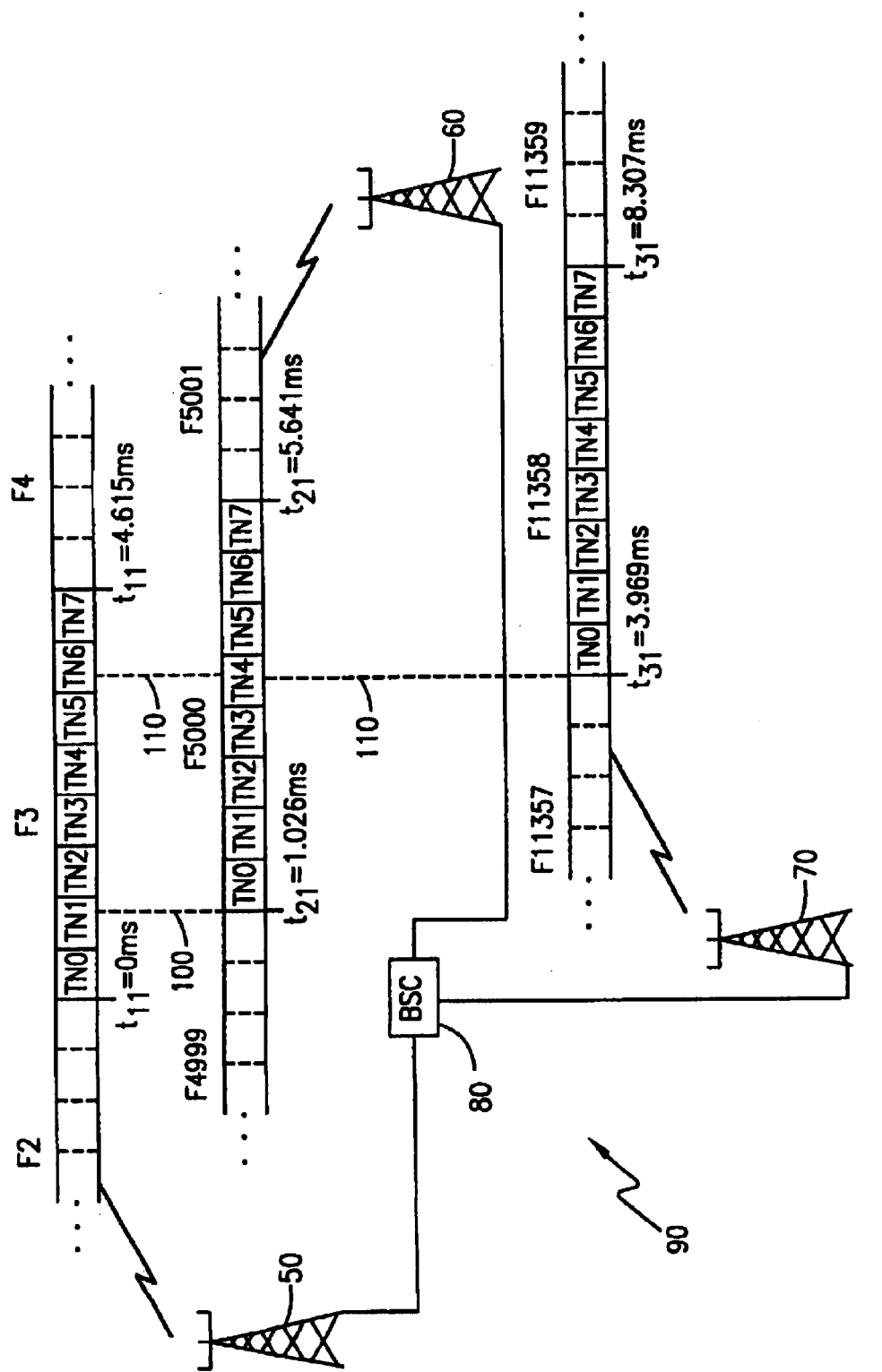
FIG. 2 illustrates a Base Station Controller and asynchronous Base Stations operated thereon.
Figure 3:
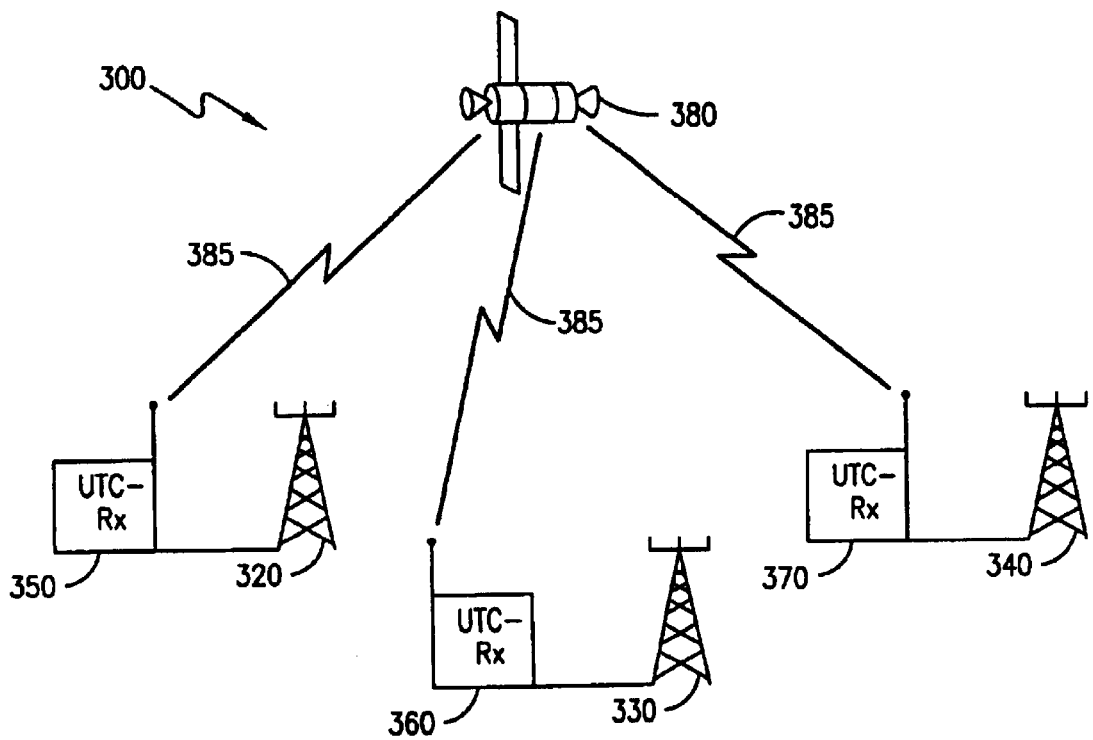
FIG. 3 is an exemplary Base Station Network and Universal Time Clock transmitter and receiver arrangement as configured in a preferred embodiment of the present invention.

In FIG. 3 is shown an exemplary embodiment of the present invention which greatly enhances the timing capabilities of the conventional systems, as shown in FIG. 2. A telecommunications network 300 is shown including BSs 320, 330, and 340 with each having respective Universal Time Clock Receivers (UTC-RX) 350, 360, and 370 coupled thereto. The telecommunications network 300 further includes a satellite 380 for transmitting a reference signal that is received concurrently by each of the UTC-RXs 350, 360, and 370. Specifically, the signal transmitted by satellite 380 is a reference clock signal, hereinafter referred to as a UTC signal, generally designated by the reference numeral 385, such as the well known Universal Time Clock (UTC) operated and maintained by the U.S. Naval Observatory and utilized by the NAVSTAR Global Positioning System (GPS). UTC-RXs 350, 360, and 370, by virtue of the UTC signal 385 from the orbiting satellite 380, allow the respective BSs 320, 330, and 340 to share a common reference clock.

Figure 4:
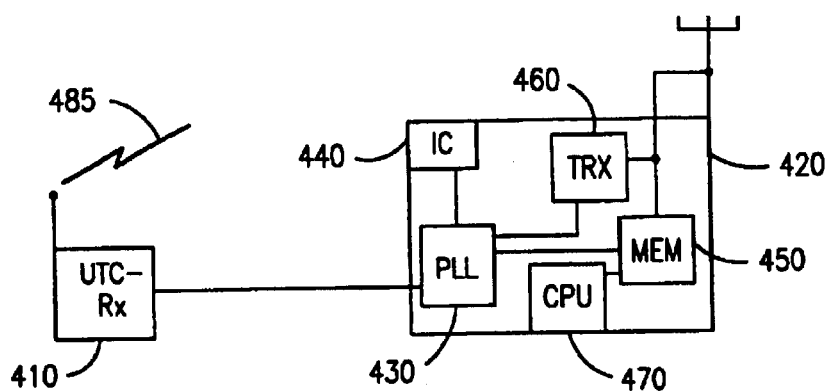
FIG. 4 is Base Station and Universal Time Clock Receiver arrangement of the present invention.

With reference now to FIG. 4 of the drawings, there is illustrated in more detail a BS and UTC-RX component arrangement in accordance with a preferred embodiment of the present invention. As described hereinabove in connection with FIG. 3, a UTC-RX 410 receives a UTC signal 485 (corresponding to the UTC signal 385 in FIG. 3) and forwards it to a BS 420 coupled thereto. In particular the BS 420 includes a Phase Lock Loop (PLL) 430 circuit to which an Internal Clock (IC) 440 for the BS 420, the UTC-RX 410, and a BS Memory 450 are coupled thereto. The phase-locked clock signal is then used to drive a transceiver (TRX) 460. By providing each BS 420 with a common reference clock via the respective UTC-RX 410 and subsequently phase locking the IC 440 of each BS 420 with the UTC signal 485, it is ensured that each BS 420 is transmitting substantially in phase with respect to one another. More importantly, phase locking the IC 440 with the reference clock signal enables greater accuracy for time measurements with regard to measuring precise moments when specific time slots, or frames, are transmitted, where these time measurements are stored in Memory 450.

A CPU 470 is coupled to Memory 450 for extracting data from Memory 450 and performing calculations thereupon. Memory 450 stores the UTC Signal 485 measurements and frame numbers corresponding to the recordation of the UTC Signal 485. Furthermore, Memory 450 may be used to store results of modulo operations performed on the stored UTC Signal 485, as described hereinafter with reference to FIG. 5. It should be understood that an any particular moment, preferably coinciding with the beginning of transmission of a TN0, Memory 450 records the UTC Signal 485 and the associated frame number. This time measurement and storage, however, may occur upon specified events, i.e. power up of the BS 420 and at specific intervals thereafter or upon command of a commanding node, e.g., the BSC 80 shown in FIG. 2, or both.

After receiving the UTC time and the frame number corresponding to the stored UTC time, CPU 470 extracts this data from the signal stream and performs a modulo time-of-one-frame operation. The results of this modulo operation may then be stored temporarily into Memory 450 and later returned to the BSC 80 to coordinate synchronicity, or, alternatively, the modulo results may be immediately returned to the BSC 80. The BSC 80, upon reception of the modulo results from a number of BSs, is then easily able to determine the particular time slot offsets among a group of non-synchronized BSs, such as the non-synchronized BSs 50, 60, and 70 illustrated and described in connection with FIG. 2.

Figure 5:
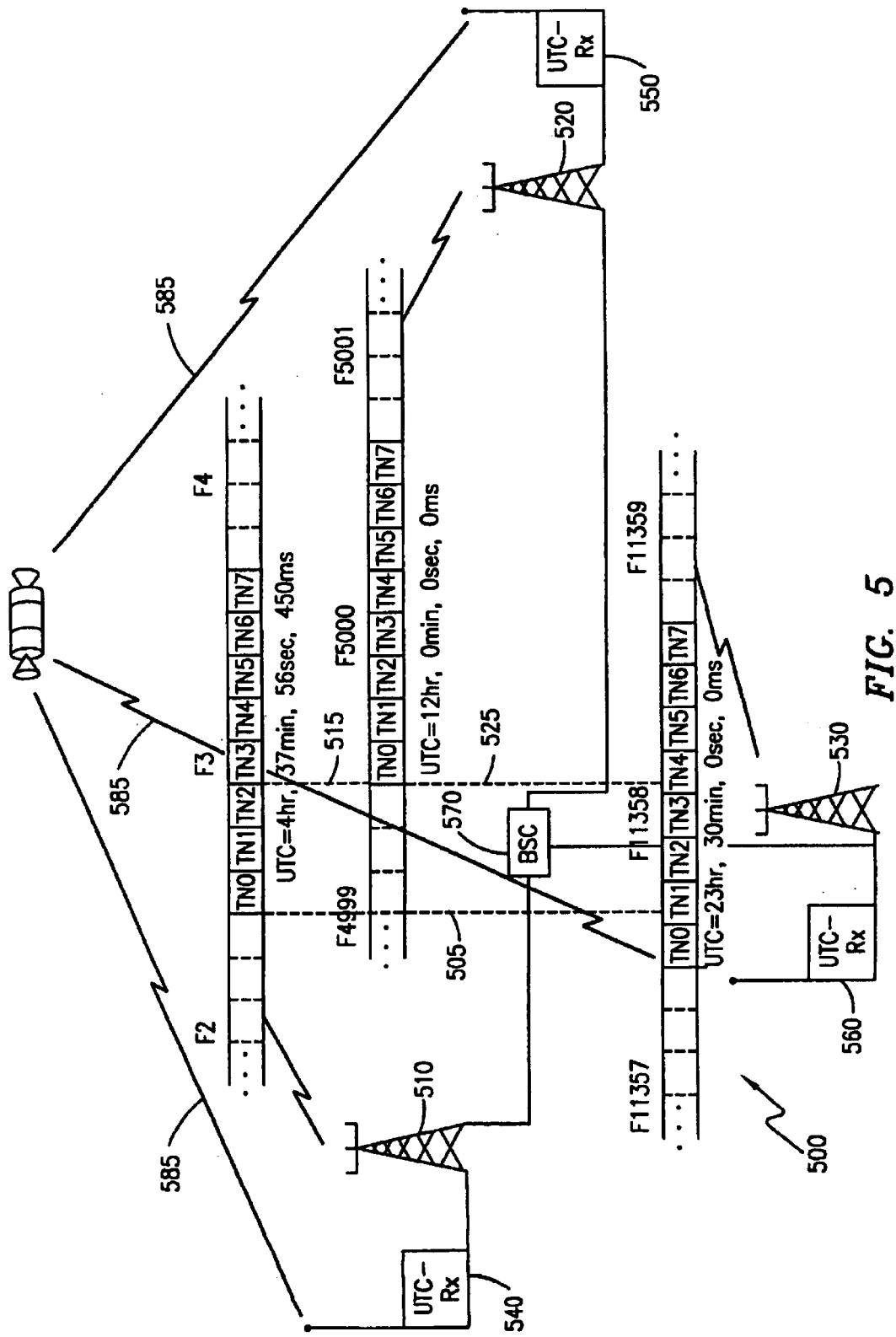
FIG. 5 is an exemplary asynchronous network as arranged in a preferred embodiment of the present invention.
Figure 6:
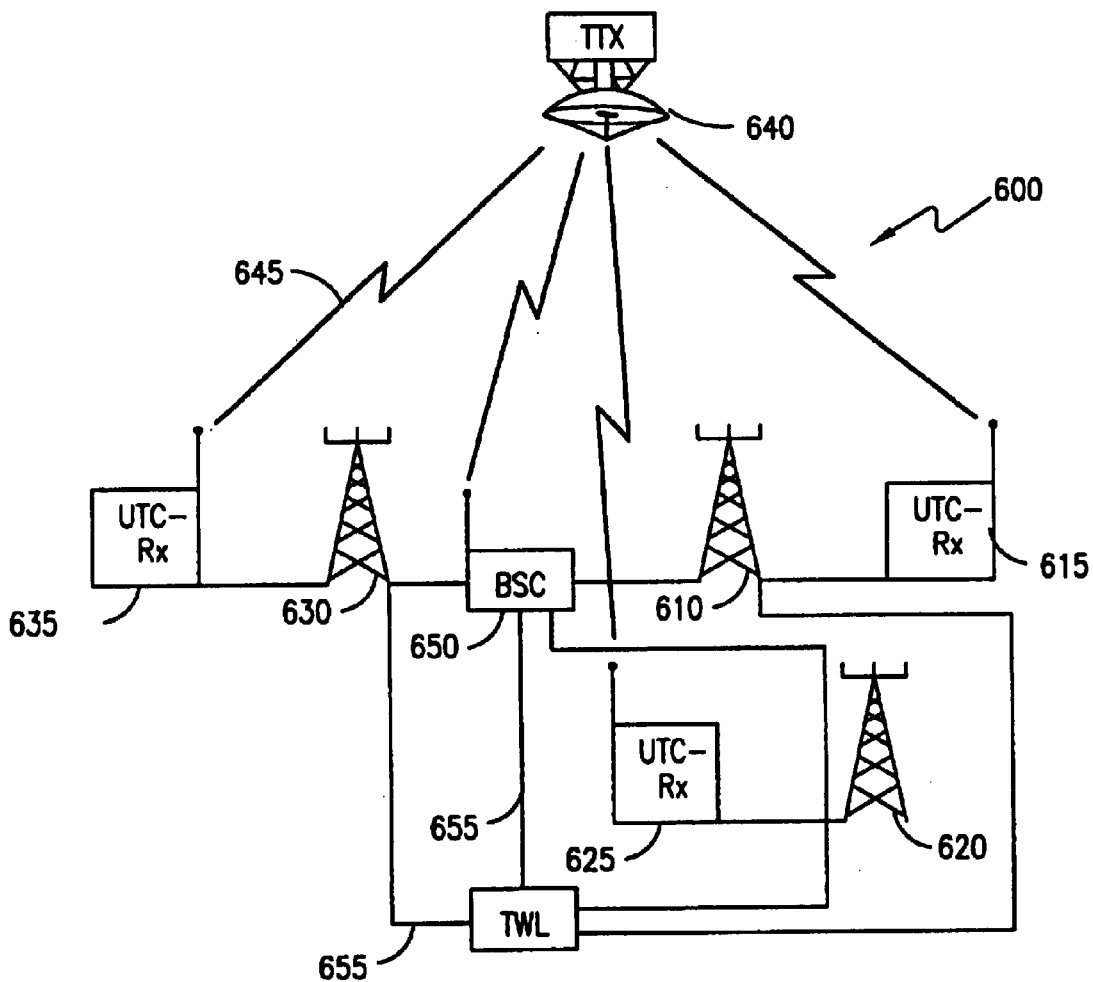
FIG. 6 is an exemplary asynchronous network as arranged in another preferred embodiment of the present invention.

With reference now to FIG. 5, there is illustrated an exemplary telecommunications network 500 of asynchronously operating BSs, such as also shown and described in connection with FIG. 2, but with the improvements of the present invention as shown and described in connection with FIGS. 3 and 4. In particular, BSs 510, 520, and 530 are coupled to UTC-RXs 540, 550 and 560, respectively, and a BSC 570. In a presently preferred embodiment of the present invention, the UTC-RXs 540, 550, and 560 receive a UTC Signal 585 from an orbiting satellite 580. It should, of course, be understood however that Satellite 580 could be replaced with a ground-based transmitter capable of transmitting the UTC Signal 585 over the air interface or through a wired link to BSs 510, 520, and 530, as illustrated and described hereinafter in connection with FIG. 6.

With reference again to the system in FIG. 5, the operations of a timing calibration will now be described. First, BS 510, the reference BS, executes a UTC recording at the beginning of TN0 of its frame F3, as illustrated by a representative stream of transmission frames, e.g., F2, F3, and F4, and time slots therein, e.g., TN0–TN7 in frame F3, as shown in FIG. 5. It should be understood that the particular frame number of the UTC Signal 585 recording is inconsequential since it is the relative frame displacements that are desired. However, the recording of the UTC Signal 585 preferably corresponds to the beginning of transmission of TN0, and, consequently, the beginning of transmission of a given, constant-length frame.

It should be understood, however, that the UTC time measurement is generally a large number representing an ever-increasing time date number. For example, the UTC recording for BS 510 at the beginning of transmission of TN0 of F3 in FIG. 5 is about 16,676,000 ms which is equivalent to 4 hours, 37 minutes, 56 seconds, and 450 ms. BS 510 then performs a modulo operation on this large UTC value, dividing the number by the time of one frame span, i.e., 4.615 ms. In other words, dividing the UTC time by the span of a single frame leaves only the fractional part of the quotient pursuant to modulo mathematical operations, which in the present example is the remainder number or 0.45287 (the truncated portion of 16,676,000/4.615). This remainder is then multiplied by the frame span (.45287×4.615=2.0899) and the product rounded to the nearest multiple of a ½ TN span (0.577/2). In this case, 2.0899 is rounded to 2.0195 which corresponds to 7/2 TNs. The modulo calculation of the present invention is then completed by dividing this rounded-off value by a single time slot span (0.577), i.e., 2.0195/0.577. For BS 510, this yields a final modulo value of 3.5, representing the offset. The operations leading to this result are summarized below.

(1) UTC reading at TN0: 4 hr., 37 min., 56 s., 450 ms.=16,676,000 ms.

(2) Frame Number of TN0 at UTC reading: 3 UTC modulo time of one Frame: 16,676,000/4.615= 3613434.45287

(3) Quotient Remainder multiplied by one frame span: (0.45287)(4.615)=2.0899

(4) Product rounded to nearest multiple of ½ TN: 2.0899≈7/2 TNs=2.0195

(5) Divide Rounded Product by TN span for Modulo Result: 2.0195/0.577=3.5

Similarly, for BS 520, the modulo calculation corresponding to the UTC time (12 hr., 0 min., 0 sec., 0 ms) as shown in FIG. 5 is 0.5. Likewise, the result of the modulo operation for BS 530 having a UTC time 23 hr., 30 min., 0 sec., 0 ms is 5.0. It should be apparent that all of the results of the aforedescribed modulo operations will be between 0 and 7.5, a step-wise function with the non-zero results being in multiples of ½. For the above example, BS 530 is transmitting 1.5 (5−3.5) time slots ahead of BS 510, as indicated by referring to a reference line 505. In other words, when BS 530 and BS 510 are both transmitting frames concurrently according to the timing depicted in FIG. 5, BS 530 will have progressed through its first time slot and approximately halfway through the second, TN1, when BS 510 begins transmitting its TN0. Similarly, BS 530 is transmitting 4.5 (5−0.5) time slots ahead of BS 520 or, equivalently, BS 530 lags 3.5 time slots behind BS 520, as indicated by referring to another reference line 525. Likewise, BS 520 is transmitting 3 (3.5−0.5) time slots behind BS 510, as indicated by reference line 515. described in connection with the embodiment shown in FIG. 5, but, instead of employing a satellite 580 to convey the timing reference information, employs a land-based timing transmitter for the UTC signal. In particular, a telecommunications system, generally designated by the reference numeral 600 in FIG. 6, includes several BSs 610, 620 and 630 and UTC-RXs 615, 625 and 635, respectively, attached thereto. A timing transmitter (TTX) 640 is employed to transmit a UTC signal 645 to the respective UTC-RXs 615, 625 and 635. Alternatively, the TTX 640 may broadcast the UTC signal 645 over the air interface to a BSC 650 in communication with the respective BSs 610, 620 and 630 to coordinate timing. Alternatively, a timing wireline (TWL) device may transmit a wireline UTC signal over a wireline interface 655 with the BSC 650 or the respective BSs 610, 620 and 630, as illustrated.

It should be understood that, although the preferred embodiments of the present invention are practiced in a time division multiple access format, the principles of the present invention may also be practiced in a variety of digital systems such as code division multiple access (CDMA) systems or hybrid CDMA/TDMA systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication system for determining a time slot transmission offset of a first transmitter relative to a second transmitter, said communication system comprising:

a reference time clock transmitter for transmitting a reference clock signal to at least said first and second transmitters, said first and second transmitters generating respective timing signals in response to receiving said reference clock signal;

a controlling node for receiving said respective timing signal from said first and second transmitters; and a processor, attached to said controlling node, for computing said time slot transmission offset between the respective timing signals of the first and second transmitters using a modulo time-of-one-frame calculation having the following steps:

(a) determining, for each of said respective timing signals, a value at a moment corresponding to commencement of transmission of a particular time slot and a frame number associated therewith;

(b) dividing each said value by a transmission time for one frame;

(c) multiplying a remainder of a quotient from step (b) by the time for one frame transmission; and (d) dividing a rounded product from step (c) by a time slot span, resulting in said time slot transmission offset.

2. The system according to claim 1, wherein said first and second transmitters comprise respective Base Station Transceivers.

3. The system according to claim 1, wherein said controlling node is a Base Station Controller.

4. The system according to claim 1, wherein said reference time clock transmitter is a satellite-based transmitter.

5. The system according to claim 1, wherein said reference clock signal is a Universal Time Clock signal.

6. The system according to claim 1, wherein said reference time clock transmitter is a land-based transmitter.

7. The system according to claim 1, further comprising:

a phase lock loop circuit, within each of said first and second transmitters, for phase locking respective Internal clocks of said first and second transmitters to said reference clock signal; and a store, within each of said first and second transmitters, for storing said reference time value of said reference clock signal and transmission frame number data associated with said time slot transmission.

8. The system according to claim 1, wherein at least one of said respective time slot transmissions is the first time slot of a TDMA frame.

9. The system according to claim 1, wherein said reference time clock transmitter transmits said reference time clock signal over a land-line interface.

10. The system according to claim 1, wherein said communication system comprises a multiplicity of transmitters therein including said first and second transmitters, each of said transmitters within said communication system being asynchronous with respect to one another.

11. In a communication system, a method for determining a time slot transmission offset of a first transmitter relative to a second transmitter, said method comprising the steps of:

receiving, by said first transmitters, a reference clock signal from a reference time clock transmitter;

generating, by said first and second transmitters, respective timing signals in response to receiving said reference clock signal;

forwarding said respective timing signals to a controlling node; and processing, by a processor attached to said controlling node, said respective timing signals to compute said time slot transmission offset between the respective time signals of the first and second transmitters using a modulo time-of-one-frame calculation having the following steps:

(a) determining, for each of said respective timing signals, a value at a moment corresponding to commencement of transmission of a particular time slot and frame number associated therewith;

(b) dividing each said value by a transmission time for one frame;

(c) multiplying a remainder of a quotient from step (b) by the time for one frame transmission; and (d) dividing a round product from step (c) by a time slot span, resulting in said time slot transmission offset.

12. The method according to claim 11, wherein said first and second transmitters have respective stores for storing said respective timing signals therein.

13. The method according to claim 11, wherein a respective one of said time slot transmissions is the first time slot of a TDMA frame.

14. The communications system of claim 1, wherein each of said respective timing signals contains information indicating a commencement of a time slot transmission at said respective first and second transmitters at a respective reference time value of said reference clock signal.

15. The method of claim 11, wherein each of said respective timing signals contains information indicating commencement of a time slot transmission at said respective first and second transmitters at a respective reference time value of said reference clock signal.

16. In a communications system for determining a time slot transmission offset between a first transmitter and a second transmitter, a controlling node comprising:

means for receiving respective timing signals generated by said first and second transmitters in response to receiving a reference clock signal from a reference time clock transmitter;

means for determining said time slot transmission offset using a modulo time-of-one-frame calculation having the following steps:

(a) determining, for each of said respective timing signals, a value at a moment corresponding to commencement of transmission of a particular time slot and a frame number associated therewith;

(b) dividing each said value by a transmission time for one frame;

(c) multiplying a remainder of a quotient from step (b) by the time for one frame transmission; and (d) dividing a round product from step (c) by a time slot span, resulting in said time slot transmission offset.

17. A method for determining a time slot transmission offset between a first transmitter and a second transmitter, said method comprising the steps of:

receiving respective timing signals generated by said first and second transmitters in response to receiving a reference clock signal from a reference time clock transmitter;

determining said time slot transmission offset using a modulo time-of-one-frame calculation having the following steps:

(a) determining, for each of said respective timing signals, a value at a moment corresponding to commencement of transmission of a particular time slot and a frame number associated therewith;

(b) dividing each said value by a transmission time for one frame;

(c) multiplying a remainder of a quotient from step (b) by the time for one frame transmission; and (d) dividing a round product from step (c) by a time slot span, resulting in said time slot transmission offset.

\* \* \* \* \*